(12) United States Patent
Aaron (10) Patent No.: US 7,328,451 B2
(45) Date of Patent: Feb. 5, 2008

(54) NETWORK FIREWALL POLICY CONFIGURATION FACILITATION

(75) Inventor: Jeffrey A. Aaron, Atlanta, GA (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 865 days.

(21) Appl. No.: 10/611,635

(22) Filed: Jun. 30, 2003

(65) Prior Publication Data
US 2004/0268150 A1 Dec. 30, 2004

(51) Int. Cl.
*G06F 15/16* (2006.01)
(52) U.S. Cl. .................. 726/13; 713/154; 713/161
(58) Field of Classification Search .......... 726/11, 726/1, 12, 13; 713/153
See application file for complete search history.

(56) References Cited

U.S. PATENT DOCUMENTS 6,243,815 B1 * 6/2001 Antur et al. .......... 726/11
2002/0040396 A1 * 4/2002 Yoshihara et al. ....... 709/225
2002/0194495 A1 * 12/2002 Gladstone et al. ....... 713/200

FOREIGN PATENT DOCUMENTS

GB      2380279 A  *  4/2003

OTHER PUBLICATIONS

Cisco Systems, Understanding Security Policies, Sep. 28, 2002, pp. 1-9, retrieved date Nov. 18, 2006;☐☐http://www.cisco.com/univercd/cc/td/doc/product/iaabu/centri4/user/scf4ch4.pdf.*

* cited by examiner

*Primary Examiner*—Gilberto Barrón, Jr.
*Assistant Examiner*—Samson Lemma
(74) *Attorney, Agent, or Firm*—Hope Baldauff Hartman, LLC (57) ABSTRACT

Systems for providing information on network firewall policy configuration facilitation include a firewall facilitation coordinator configured to receive a request to add an application not currently supported by a user's firewall policy, and to generate a time window during which a user can run the application and observe which types of packets are utilized by the application. A policy modification agent associated with the firewall is configured to communicate with the firewall facilitation coordinator. The policy modification agent is further configured to receive a firewall modification request from the firewall facilitation coordinator, to accomplish the observation of packets flowing through the firewall during the time window, and to subsequently modify the user's firewall policy such that the application is able to communicate as needed through the firewall, rather than being blocked. Other systems and methods are also provided.

44 Claims, 8 Drawing Sheets

NETWORK FIREWALL POLICY CONFIGURATION FACILITATION

TECHNICAL FIELD

The present invention is generally related to computer systems and, more particularly, is related to electronic network security systems.

BACKGROUND OF THE INVENTION

Firewalls are the cornerstone of security for communications networks and resources attached to those networks. Network-based firewalls offer advantages over host-based firewalls, especially with respect to providers such as BellSouth that wish to offer such security services to broadband customers. However, firewalls are difficult to configure and traditionally are administered by experts. Network-based firewalls are difficult to customize due to their remoteness from the user because they are typically located in the provider network rather than on the user's computer and users are likely separated from the administrators of these firewalls. Furthermore, where firewall policy is determined for the sake of business operations, that policy is kept as simple as possible in order to better ensure security and to keep change management costs down resulting in firewall policies that tend to be restrictive rather than enabling.

Additionally, consumer firewalls, such as software firewalls installed on PCs that connect to the Internet via broadband (e.g., DSL), are owned and operated by the consumer who is generally not an expert and is ill-equipped to manage the firewall properly, often resulting in considerable user frustration and improper firewall configuration. Furthermore, consumers are paying for the firewall and should be able to determine their policy, and not have firewall policies dictated to them. Thus, firewalls for consumers cannot be overly restrictive just to simplify matters, yet a way must be found to aid the consumer in properly configuring the firewall so that good security is obtained.

Thus, heretofore-unaddressed needs exist for a solution that addresses the aforementioned and other deficiencies and inadequacies.

SUMMARY OF THE INVENTION

Preferred embodiments of the present invention provide for network firewall policy configuration facilitation. Briefly described, in architecture, one embodiment, among others, can be implemented to include a firewall facilitation coordinator configured to receive a request to add an application not currently supported by a user's firewall policy, and to generate a time window during which a user can run the application. A policy modification agent is configured to communicate with the firewall facilitation coordinator. The policy modification agent is further configured to receive a firewall modification request from the firewall facilitation coordinator and to modify the user's firewall policy.

Also, one embodiment, among others, can be broadly summarized by the following steps: notifying a coordinating entity of a request to modify a firewall policy to incorporate filtering rules to allow communications or packets from a new application to pass through the network-based firewall without being blocked; notifying a policy modifier of the modification request; sending a user an indication of a time period during which the user can exercise a new application; and examining the user-originated communications or packets traversing the firewall during that time period and modifying the user's policy such that packets associated with the new application are allowed to pass through the firewall.

Systems, methods, features, and advantages of the present invention will be or become apparent to one with skill in the art upon examination of the following drawings and detailed description. It is intended that all such additional systems, methods, features, and advantages be included within this description and be within the scope of the present invention.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENTS

Disclosed herein are systems and methods for network firewall policy configuration facilitation. To facilitate description of the inventive system, an example system that can be used to implement the network firewall policy configuration facilitation is discussed with reference to the figures. Although this system is described in detail, it will be appreciated that this system is provided for purposes of illustration only and that various modifications are feasible without departing from the inventive concept. After the example system has been described, an example of operation of the system will be provided to explain the manner in which the system can be used to provide network firewall policy configuration facilitation.

Figure 1:
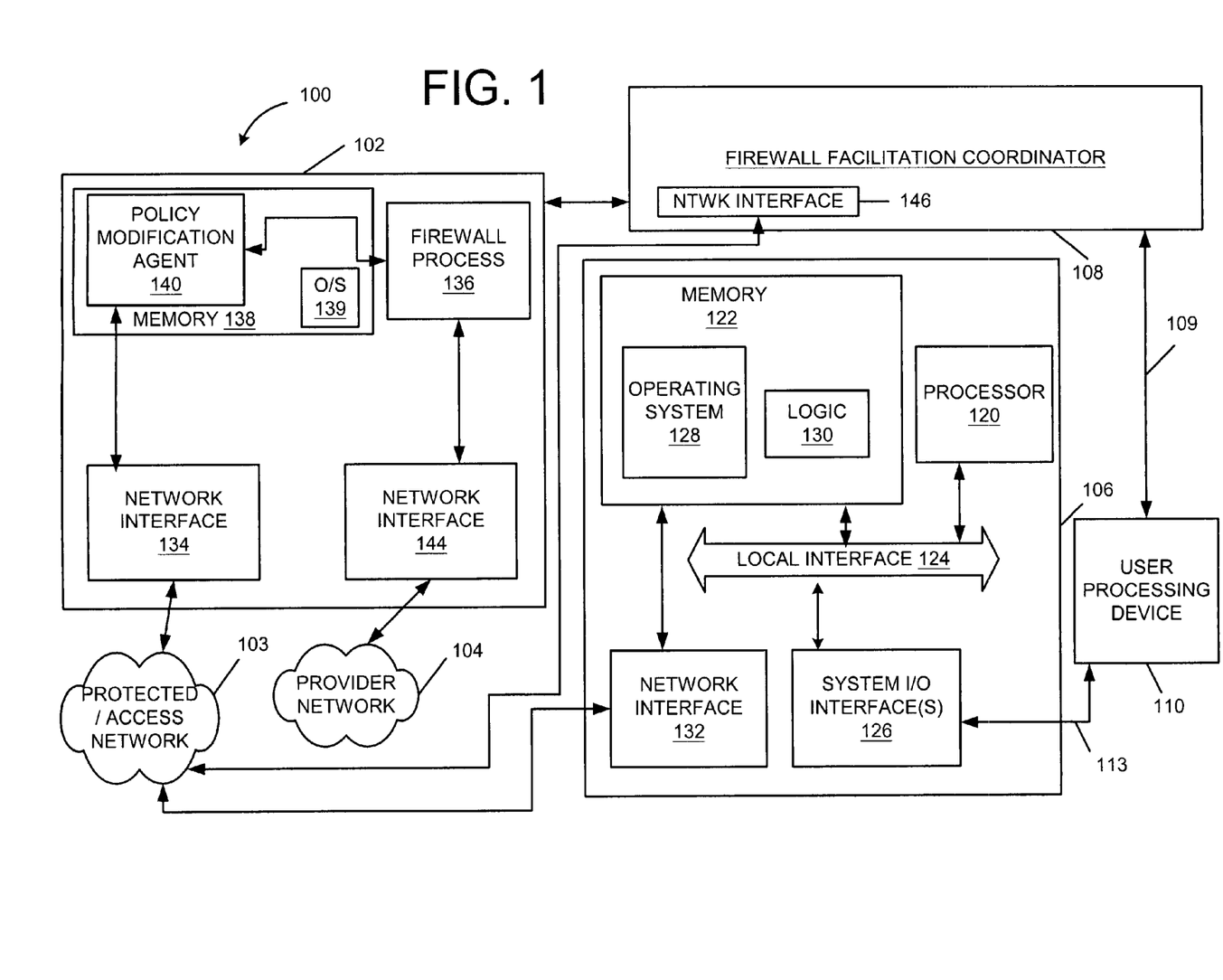
FIG. 1 is a block diagram depicting a preferred embodiment of a system for network firewall policy configuration facilitation.

Referring now in more detail to the drawings, in which like numerals indicate corresponding parts throughout the several views, FIG. 1 is a block diagram depicting a preferred embodiment of a system 100 for network firewall policy configuration facilitation. The system 100 includes a network based firewall 102, a protected/access network 103, a provider network 104, a host processing device such as a host computer 106, a firewall facilitation coordinator processing device (FFC) 108 and user processing device 110.

Generally, the host computer 106 is located at a user's location and administered by the user or an administrator on behalf of the user. In an example, the network based firewall 102 is deployed in a service provider's network, such as a telecommunications provider network, yet is accessible to and customizable by the user. The FFC 108 is located between the host computer 106 and the network based firewall 102. In an example where the user utilizes a telephone or other device not part of the network, an optional out of band communications link 109 is available for accessing the FFC 108. In an example where the user's processing device 110 is remotely located from the host device 106, in one embodiment, the user's processing device 110 communicates with the host device 106 via a communications link 113, the can be a wireline, wireless, local area network connection, among others. Preferably, the FFC 108 provides a mechanism for the user to access the network based firewall 102. Once the user has accessed the network based firewall 102, the user can utilize the policy modification agent 140 to modify firewall processes 136 that the user has authorization to modify.

In an example, the user accesses the FFC 108 when they wish to use an application not currently accounted for in the firewall policy. The FFC 108 notifies the network based firewall 102 of the modification request. The policy modification agent 140 acknowledges the modification request to the FFC 108, which subsequently acknowledges the request back to the user. The user also receives a time window indication during which the user can exercise the new application. When the user exercises the new application, the new application will try to communicate through the network based firewall 102. Since the network based firewall 102 is aware that the user wishes to configure a new application into the firewall policy, the network based firewall 102 does not block the application's communication. Within the designated time window, the policy modification agent 140 examines the communication (i.e., packets), and modifies the user's firewall policy such that this application is allowed to pass through unhindered. An acknowledgement of completion from the policy modification agent 140 can be sent to the FFC 108 and on to the user's processing device 110.

The protected/access network 103 and the provider network 104 may be any type of communications network employing any network topology, transmission medium, or network protocol. For example, such a network may be any public or private packet-switched or other data network, including the Internet, circuit-switched network, such as a public switch telecommunications network (PSTN), wireless network, or any other desired communications infrastructure and/or combination of infrastructure.

Generally, the user processing device 110 is preferably a personal computer configured to communicate with the FFC 108 and the host computer 106. In an embodiment, the host computer 106, FFC 108 and network based firewall 102 are located in the service provider's network. In an alternative preferred embodiment, the user processing device is part of a local network with the host computer 106 remotely located from the user processing device 110 and managed by a system administrator. In another embodiment, the host computer 106 and user processing device 110 are colocated at a user location, among others. The host computer 106 is preferably configured to communicate with the network based firewall 102 either directly or alternatively via the provider network 104.

Generally, in terms of hardware architecture, as shown in FIG. 1, the host computer 106, is configured as a digital computer that includes, inter alia, a processor 120 and memory 122. In an embodiment, the user processing device 110 and FFC 108 are configured as digital computers having a processor, memory, local interfaces, system interfaces, among others. Input and/or output (I/O) devices (or peripherals) can be communicatively coupled to a local interface 124 via a system I/O interface 126, or directly connected to the local interface 124. The local interface 124 can be, for example but not limited to, one or more buses or other wired or wireless connections, as is known in the art. The local interface 124 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 120 is a hardware device for executing software, particularly that stored in memory 122. The processor 120 can be any custom made or commercially available processor, a central processing unit (CPU), an auxiliary processor among several processors, a semiconductor based microprocessor (in the form of a microchip or chip set), a macroprocessor, or generally any device for executing software instructions.

The memory 122 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 122 may incorporate electronic, magnetic, optical, and/or other types of storage media. Note that the memory 122 can have a distributed architecture, where various components are situated remote from one another, but can be accessed by the processor 120.

The software and/or firmware in memory 122 may include one or more separate programs, each of which comprises an ordered listing of executable instructions for implementing logical functions. In the example of FIG. 1, the software in the memory 122 can include logic 130, such as logic for firewall policy configuration facilitation and a suitable operating system (O/S) 128. In an embodiment, the FFC 108 is resident in memory 122 of the host computer 106. In an alternative embodiment, the FFC 108 is resident in memory of a remote computing devices for management and administrative purposes. The operating system essentially controls the execution of other computer programs, and provides scheduling, input-output control, file and data management, memory management, and communication control and related services.

The logic 130 is a source program, executable program (object code), script, or any other entity comprising a set of instructions to be performed. When the logic 130 is implemented as a source program, then the program needs to be translated via a compiler, assembler, interpreter, or the like, which may or may not be included within the memory 122, so as to operate properly in connection with the O/S. Furthermore, logic 130 can be written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada.

The I/O devices may include input devices, for example but not limited to, a keyboard, mouse, scanner, microphone, etc. Furthermore, the I/O devices may also include output devices, for example but not limited to, a printer, display, etc. The I/O devices may further include devices that communicate both inputs and outputs, for instance but not limited to, a modulator/demodulator (modem; for accessing another device, system, or network), a radio frequency (RF) or other transceiver, a telephonic interface, a bridge, a router, etc. Finally, I/O 126 may couple to the provider network 104.

When the logic 130 is implemented in software, as is shown in FIG. 1, it should be noted that logic 130 can be stored on any computer-readable medium for use by or in connection with any computer related system or method. The logic 130 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the logic 130 is implemented in hardware, the logic 130 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. The host computer 106 further includes a network interface 132 (such as an adapter card, e.g., network interface card (NIC), among others). In a preferred embodiment, the network interface 132 is utilized for communicating with the network based firewall 102 via a network interface 134.

The network-based firewall 102 includes the network interface 134, firewall process 136 including computing processing (not shown) such as processor, system interfaces, local interfaces, among others, memory 138, a protected network 103, such as an intranet, and a network interface 144 for communicating with the provider network 104. The software and/or firmware in memory 138 may include one or more separate programs, each of which comprises an ordered listing of executable instructions for implementing logical functions. In the example of FIG. 1, the software in the memory 138 can include a policy modification agent (PMA) logic 140, and a suitable operating system (O/S) 139. The operating system 139 preferably controls the execution of other computer programs, and provides scheduling, input-output control, file and data management, memory management, and communication control and related services, among others.

The firewall facilitation coordinator 108 is software or logic residing on a computing device. In a preferred embodiment, the FFC 108 includes a network interface 146 for communicating with the network interface 134 of the network-based firewall 102 and also the network interface 132 of the host computer 106, via the protected/access network 103.

Figure 2:
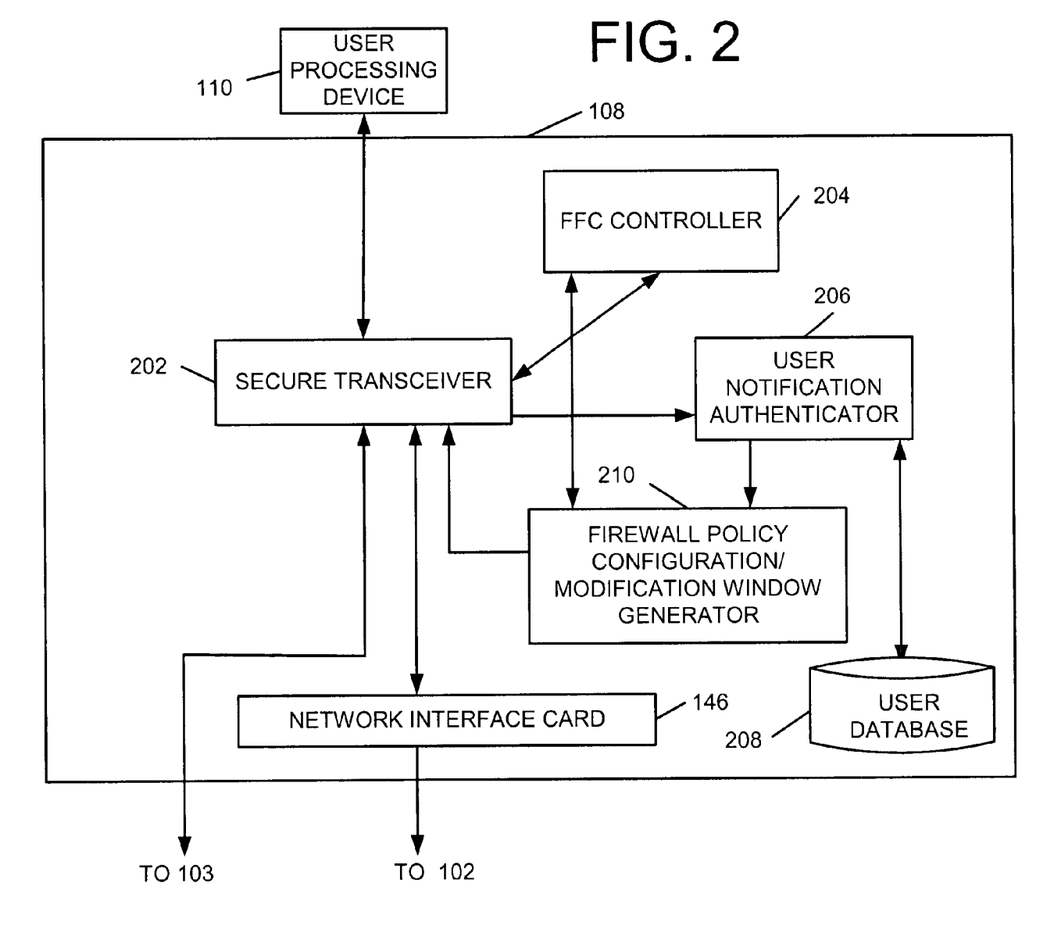
FIG. 2 is a block diagram depicting a preferred embodiment of a firewall facilitation coordinator of a system for network firewall policy configuration facilitation.

FIG. 2 is a block diagram depicting a preferred embodiment of a firewall facilitation coordinator (FFC) 108 of a system for network firewall policy configuration facilitation. In a preferred embodiment, the FFC 108 is preferably positioned in a protected network where a host computer and a user processing device reside. Preferably, the firewall process 136 is located between the protected network 103 and the Internet 104, to shield the protected network 103 from threats originating on the Internet 104.

The FFC 108 can encompass a number of simpler modules. In an example, the modules include a secure transceiver 202, a FFC controller 204, a user notification authenticator 206, a user database 208, and a firewall policy configuration/modification window generator 210 and the network interface 146. In a preferred embodiment, these modules are software process, modules, or routines, or alternatively are implemented in hardware. Alternately, the user database 208 could be a separate external database connected to the FFC 108 via the protected network 103.

In an example, the FFC 108 receives notifications at the secure transceiver 202 sent by the user's processing device 110 when the user wishes to configure a "new" application by incorporating new filtering rules into the user's firewall policy that specifically allows the communications or packets to/from that application to pass through the firewall without being blocked. Preferably, the notifications or requests are sent by the user's processing device 110 via the host computer 106 utilizing the protected network 103 (i.e., in-band communication) or via a separate method, such as using a telephone (not shown) (i.e., out-of-band communication). Out-of-band communication may be preferred in some circumstances. If out-of-band notification is used, the FFC 108 includes modem connections for communication with a telephone system, or attachment to an automated interactive telephone menu system that allows the user to select and communicate the request and receive acknowledgements and other resulting information from the FFC 108. When in-band communications are used, the network interface 146 and 134 connect to the protected network 103 and transmit/receive the communications over the network.

If the user utilizes the user processing device 110 to send the notification, the method of notification includes email, web access, or among other notification methods. In a preferred embodiment where email is used, the FFC 108 includes a mechanism to receive email. Alternately, the FFC 108 could be interfaced to a separate device or server or software application, which receives email. In a preferred embodiment where web access is used, the FFC 108 includes a web server that is attached to, or communicates with, a separate supporting web server, which the user accesses over the provider network 104. Preferably, standard secure methods that include cryptographic authentication and encryption are used (e.g., encrypted mail or SSL-protected web access, or SSH or IPsec) for communication between the host computer 106 and the FFC 108.

In an example, when the FFC 108 receives a notification to add a "new" application, the FFC 108 decodes or decrypts the notification as needed using the capabilities of the secure transceiver 202, which may utilize standard decryption methods such as included in SSL, SSH, or IPsec, and interprets the notification to understand the user's request. Since the number of users/customers is anticipated to be great, a separate module and database are preferably used for authentication. The FFC 108 includes a database 208 that is configured with a list of authorized users. The user notification authenticator 206 interacts with the database 208 to authenticate the user prior to acting on the request via standard authentication methods such as included in SSL, SSH, or IPsec based for instance upon shared encryption keys/secrets/passwords or upon cryptographic certificates. If the user is authenticated as an authorized user, the firewall policy configuration/window generator 210 generates a time window during which the user can exercise (run) the "new" application. Optionally, additional information in the notification or request and/or the user database 208 may be consulted to determine the best time window to offer the user.

Once the specific time window (e.g., start time, duration, and end time) is generated, the FFC 108 communicates this information to the PMA 140 on the network-based firewall 102. Preferably, communications between the FFC 108 and the network-based firewall 102 utilize standard secure methods (e.g., SSL, SSH, IPsec). Non-standard secure methods or non-secure methods may also be used in an alternate embodiment of the invention. In addition, in-band or out-of-band communications, or both, can be utilized between the FFC 108 and PMA 140.

Upon receipt of a positive acknowledgement sent to the FFC 108 from the PMA 140 indicating that the time window is acceptable to the firewall, the FFC 108 sends an acknowledgement back to the user's processing device 110 via, for example the secure transceiver 202 communicating to the host computer 106. This acknowledgement preferably includes the time window information, among other information. If a negative acknowledgement is received from the PMA 140, the FFC controller 204 may instruct the firewall policy configuration/modification window generator 210 of the FFC 108 to calculate another time window and try again. Optionally, the FFC 108 may keep a record of previous time window requests sent to the PMA 140 that have been positively acknowledged, so that it can use this record to avoid making any future time window requests for time windows that are already scheduled in the PMA 140 and therefore will not be available. In a preferred embodiment, if a configurable number of successive time windows are attempted by the FFC 108 with only negative acknowledgments being received from the PMA 140, the FFC 108 may then send a "failed" acknowledgement to the user's processing device 110 and notify others, such as administrators or help desk staff as appropriate via standard methods such as email, pager alerts, or various alarms, and optionally indicate in the "failed" user acknowledgement that the user or customer should request assistance. In an alternative preferred embodiment, the FFC 108 asks the user via the user's processing device 110 if the user wishes to continue the repetitive time window generation attempts until satisfactory results are obtained, or until optional additional configurable limits are exceeded.

If a time window is agreed upon by the PMA 140 and communicated to the user, the user is expected to run (exercise) the "new" application during this time window. If the user exercises the application during the time window, and all goes well with respect to the firewall process 136 and PMA 140 portion of this process, the FFC 108 will receive a positive acknowledgment from the PMA 140 upon completion. The FFC 108 may receive, and forward to the user's processing device 110, an unqualified completion message. Alternatively, the FFC 108 may receive a qualified completion message, such as a message that the user's firewall policy was successfully modified but that questionable packets were also detected during the time window, that these particular packets were not included in the policy's new (updated) filtering rules, and that the user may need to repeat the entire policy modification process if the application still does not work properly through the firewall. When questionable packets are encountered during the time window, the "new" application's communications may be able to traverse the firewall successfully if those questionable packets were truly not associated with the "new" application but rather were associated with other applications or software process, either already incorporated into rules with the user's policy, or else not incorporated. Questionable packets might arise from other applications resident on the host computer 106 that coincidentally sent packets through the firewall during the time window unbeknownst to the user. For example, "allowed" or "authorized" application might be designed to communicate periodically, at random intervals, or when triggered by some event not visible to the user. In addition, Trojans, spy-ware, and mal-ware of various sorts might autonomously send packets at any time. In a preferred embodiment, the newly configured policy for the "new" application should incorporate "new" changes that reflect only that application, not other applications or software process. Therefore, in a preferred embodiment questionable packets are initially excluded from the firewall policy modifications under the assumption that they are unlikely to be associated with the "new" application. Categorizing packets as "questionable" is described below with regard to the functionality of the PMA 140.

In an example, when questionable packets are associated with the "new" application, and should have been considered when updating the policy but were not, the user may notice that the application does not function properly. To assist the user in investigation of the problem the user should consider information contained in the qualified acknowledgement from the FFC 108. The user may choose to repeat the policy modification process. The PMA 140 has knowledge of the questionable packets previously excluded, and will attempt to properly incorporate this knowledge when the policy modification process is reattempted.

In an example when multiple types of questionable packets were encountered, the PMA 140 can include them one at a time into the modified policy, or in combinations. However, in extreme cases the FFC 108 may receive a "failed" message from the PMA 140, i.e. if the user has continued to repeat the policy modification process for the same application a number of times, for instance, more than 3 times. However, the number of times is preferably configurable and can be made dependent upon the type of application since the firewall policies for some types of applications, for instance games, are more difficult to modify successfully than others. In an example, a "failed" message indicates that the user has been unable to get the "new" application to work properly through the firewall process 136 even though a number of policy modifications via the FFC 108 and PMA 140 have been done. A "failed" acknowledgement is preferably conveyed to the user's processing device 110 by the FFC 108, and to administrators and/or helpdesk staff can be notified so that they can pro-actively assist the user. In an alternative preferred embodiment, the FFC 108 asks the user if they wish to continue the repetitive policy modification attempts until satisfactory results are obtained, or until optional additional configurable limits are exceeded. Any reasonable interaction protocol or menu tree could be used for this purpose, with any amount of designed-in variation as desired via options to be selected by the user either during the interaction or in an initial set-up process.

Figure 3:
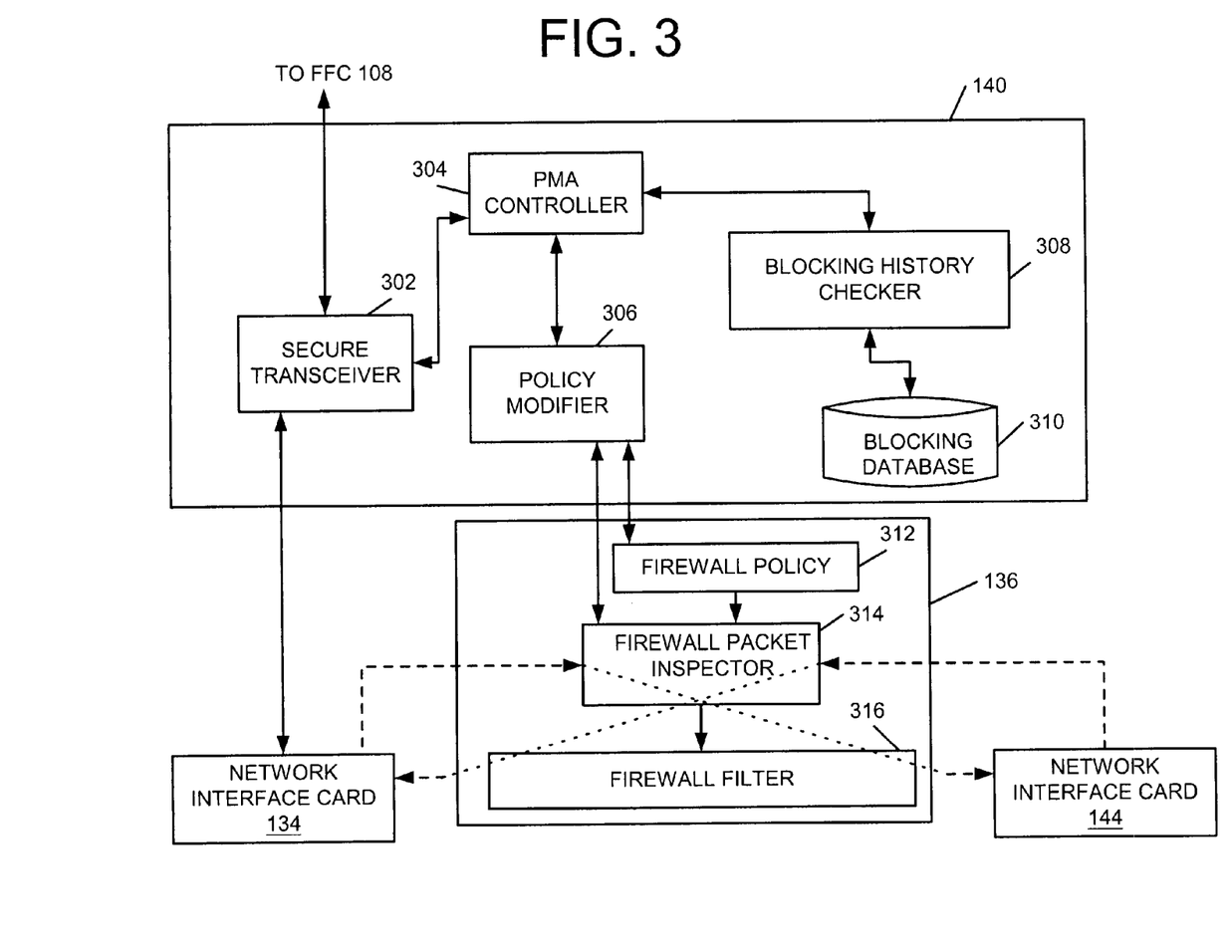
FIG. 3 is a block diagram depicting a preferred embodiment of a policy modification agent of a system for network firewall policy configuration facilitation.

FIG. 3 is a block diagram depicting a preferred embodiment of a policy modification agent (PMA) 140 of a system for network firewall policy configuration facilitation. In a preferred embodiment the PMA 140 resides on (or is attached to) the network-based firewall 102 and is adapted to receive communications from the FFC 108. In addition, the PMA 140 is configured to communicate with and influence the firewall process 136 that include a security policy encompassing a set of filtering rules. In a preferred embodiment, the PMA 140 includes a number of modules, such as a secure transceiver 302, PMA controller 304, policy modifier 306, blocking history checker 308, and blocking database 310. The secure transceiver 302 is responsible for adding encryption and authentication to communications transmitted from the PMA 140, and for authenticating and decrypting communications received by the PMA 140. The PMA controller 304 provides overall control functionality to the PMA 140, for instance coordinating the actions of the various modules, providing time window packet observations to the blocking history checker 308, and providing information to the policy modifier 306 regarding policy change requirements. The policy modifier 306 modifies the firewall policy 312, and also communicates the observations of the firewall packet inspector 314 to the PMA controller 304 during the time window. The blocking history checker 308 uses time window packet observations from the PMA controller to check the blocking history database 310 for previously observed packets, previous policy modification attempts and results, etc. The blocking database 310 can be used to record any desired information helpful to the policy modification process, including for instance previously observed packets associated with a particular host, previously observed packets associated with a particular application, packets observed during particular time windows, results of previous attempts to modify the firewall policy associated with particular hosts and/or applications, etc. In an example, these modules are software process, modules or routines. In an alternative embodiment, the modules can be partly or fully implemented in hardware. The PMA 140 preferably utilizes existing firewall process 136 components or modules, which typically includes some form or arrangement of firewall policy 312, firewall packet inspector 314, and firewall filter 316.

In an example, the secure transceiver 302 via the network interface 134 receives a time window request for a particular user and application from the FFC 108 in order to add a new application to the user's/customer's firewall policy as described above, the PMA controller 304 checks to see if the time window is available, and if available the PMA controller 304 sends an acknowledgement to the FCC 108 and likewise schedules the time window. If the time window is unavailable, the PMA 140 sends this information to the FFC 108 so that the FFC 108 can request a different time window. The PMA 140 may optionally include information on currently available time periods so as to aid the FFC 108 in selecting another time window, in which case the FFC 108 may then optionally keep a record of this information so that it can consult this record when sending future time window requests to the PMA, 140 in order to select or generate time windows which are likely to be currently unscheduled and thus acceptable to the PMA 140. For example, the secure transceiver 302 via the network interface 134 is in communication with the FFC 108 to send and receive messages containing the above-mentioned information and acknowledgements to/from the FFC 108. Information from the secure transceiver 302 is communicated to the PMA controller 304. The PMA controller 304 communicates with both the policy modifier 306 and the blocking history checker 308. When the time of a scheduled time window arrives, the PMA controller 304 communicates this to the policy modifier 306, which communicates with the firewall packet inspector 314 to observe the packets flowing through the firewall associated with the user/customer, presuming that these should be associated with the new application being exercised at that time. The blocking history checker 308 provides the PMA controller 304 access to the blocking database 310 that includes information on questionable packets associated with that user/customer and information regarding any previous policy modification attempts for the new application. The policy modifier 306 also communicates with the firewall policy 312 for the purpose of modifying the policy filtering rules as needed, and for negotiating the manner in which these rules can be modified (which may be dependent upon the particular firewall brand, model, and implementation).

In an example, the firewall process 136 receives packets from the network interface 134, 144, each network interface serving to connect the firewall to a different network as was indicated in FIG. 1. During the time window as indicated above, the firewall packet inspector 314 is directed by the policy modifier 306 to inspect or examine all the received packets associated with that time window's particular user/customer to determine at least the contents of the packet headers, including the originating and destination IP addresses, the originating and destination port numbers, and the protocol number. Optionally, data in the packet's payloads may also be inspected, particularly for complex protocols or application interactions that exchange information needed by the firewall in the packet payloads in addition to the packet headers. Preferably, the firewall packet inspector 314 utilizes information from the firewall policy 312 that has been modified as needed by the policy modifier 306 to determine how to perform the inspection or examination of the packets, for instance by selecting certain aspects or components of the packets headers and payloads to observe while ignoring other aspects or components. The packets are sent to the firewall filter 316 for filtering, during which they may either be blocked or allowed to pass. The filtered packets that are allowed to pass are typically sent to be re-transmitted via a different network interface 134, 144 than the network interface 134, 144 that originally received the packets. The filtered packets are handled in this manner so that packets originating in either network can potentially flow through the firewall to reach destinations in the other network, while being inspected and filtered in passing to achieve security by eliminating unauthorized packets or packets associated with unauthorized/dangerous communications that are purposely not allowed to traverse the firewall to reach the other network (or particular destinations on the other network), thus providing protection.

Figure 4:
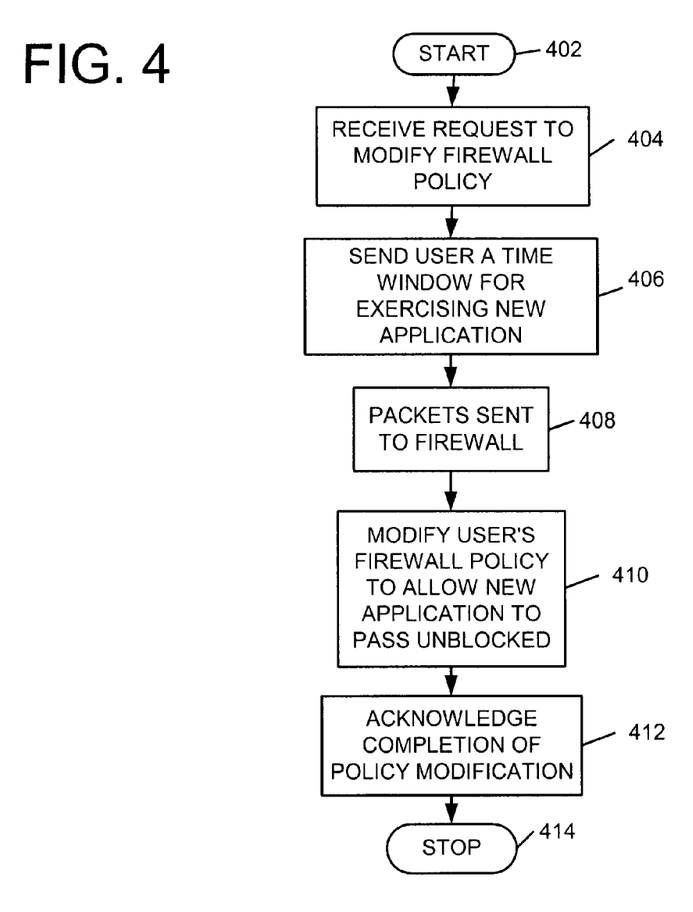
FIG. 4 is a flow chart depicting general functionality, in accordance with a preferred embodiment, of an implementation of network firewall policy configuration facilitation.

FIG. 4 is a flow chart depicting general functionality (or method), in accordance with a preferred embodiment, of an implementation of network firewall policy configuration facilitation. The process begins at 402. In a preferred embodiment, at 402, a request is received at a firewall facilitation coordinator (FFC) to modify a user's firewall policy. At 406, the FFC sends the user a time window for exercising a new application. At 408, packets associated with the new application are sent to the network-based firewall, which inspects and examines these packets to identify their type, nature, and/or pertinent characteristics. At 410, a policy modification agent (PMA) modifies the user's firewall policy to allow the new application to pass through firewall process of the network-based firewall unblocked. At 412, PMA sends an acknowledgement to the FFC of the completion of the modification. In a preferred embodiment, the FFC sends acknowledgement of the completion of the modification to the user.

FIGS. 5A-5D are flowcharts depicting more specific functionality (or methods), in accordance with a preferred embodiment, of an implementation of network firewall policy configuration facilitation. The process begins at 500. At 502, a user, utilizing their processing device or other device, sends notification to a firewall facilitation coordinator (FFC) to modify the user's firewall policy. At 504, the FFC receives notification from the user's processing device to modify the user's firewall policy. At 506, the FFC authenticates the user via a database. A time window is generated by the FFC and at 508, the time window is securely sent to a policy modification agent (PMA). In an example the PMA 140 receives a time window message from the FFC 108. The PMA 140 authenticates and decrypts the message using the same secure method in which it was sent (e.g., SSL, SSH, IPsec), and determines if the time window is acceptable. At 509, the PMA send an acknowledgement to the FFC. If the time window is acceptable, the PMA acknowledges the FFC with a positive acknowledgement. In an alternative preferred embodiment, when the PMA serves multiple FFCs, the PMA might also check a configured list of authorized FFCs so as to additionally determine that the FFC is authorized. If the time window is unacceptable, the PMA sends a negative acknowledgement. Negative acknowledgements may be necessary if for example, there is a problem with the PMA or firewall, or if there is a conflict of some kind such as the firewall is associated with multiple FFCs, and another FFC may have already requested, and been granted, the particular time window in question.

The time window request from the FFC also includes the user identification so that the PMA can associate the request and time window with the particular user's firewall policy residing on the network-based firewall, which may serve a large number of users via separate unique policy rule-sets. Additional information will also be included in the time window request, for example the name or identifier of the "new" application so that this can be used to identify the specific new rules, which will be incorporated into the modified policy for this specific application, and also so that the blocking history can be readily checked for previous policy modification attempts associated with that application. The process continues on FIG. 5B.

Figure 5A:
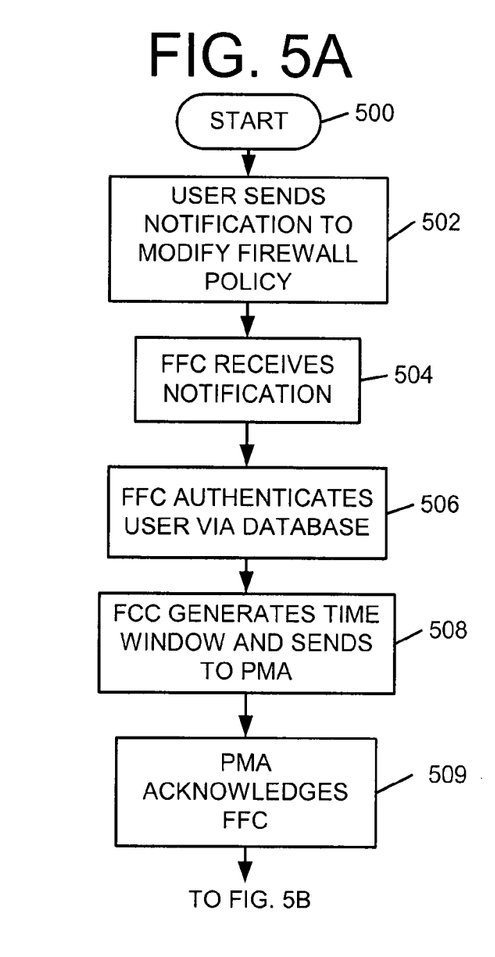
FIGS. 5A-5D are flowcharts depicting more specific functionality, in accordance with a preferred embodiment, of an implementation of network firewall policy configuration facilitation.
Figure 5B:
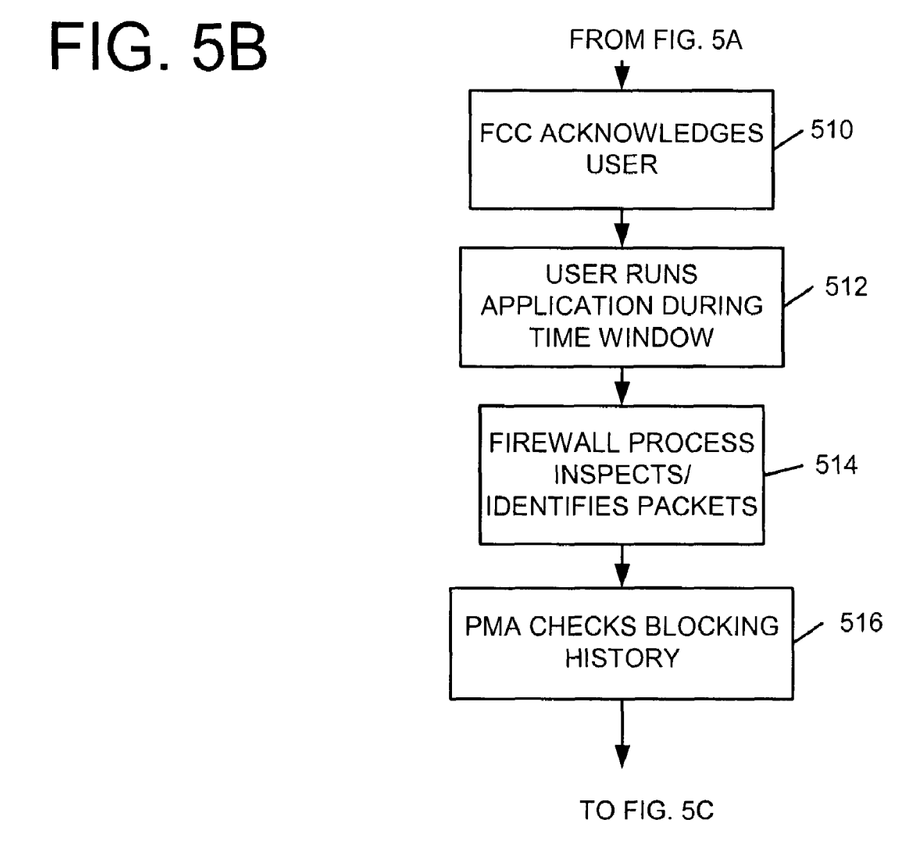

Referring to FIG. 5B, the FFC acknowledges the user. In an example, the acknowledgement informs the user regarding the time window, for instance indicating that the time window has successfully been granted and scheduled. When the time window is granted by the PMA for a particular user and a particular "new" application, at 512, the user runs (exercises) the new application during the time window. At 514, the PMA causes the firewall's packet inspection component to watch for packets from/to that user's processing device during the time window. Rather than applying normal filtering during the window, all such packets are identified and classified as needed so that the firewall can generate new filtering rules which, when added to the user's policy rule-set, would allow those packets to traverse the firewall instead of being blocked, as would otherwise be the case, for packets sent outside of the time window traversing the firewall with an unmodified rule-set.

Figure 5C:
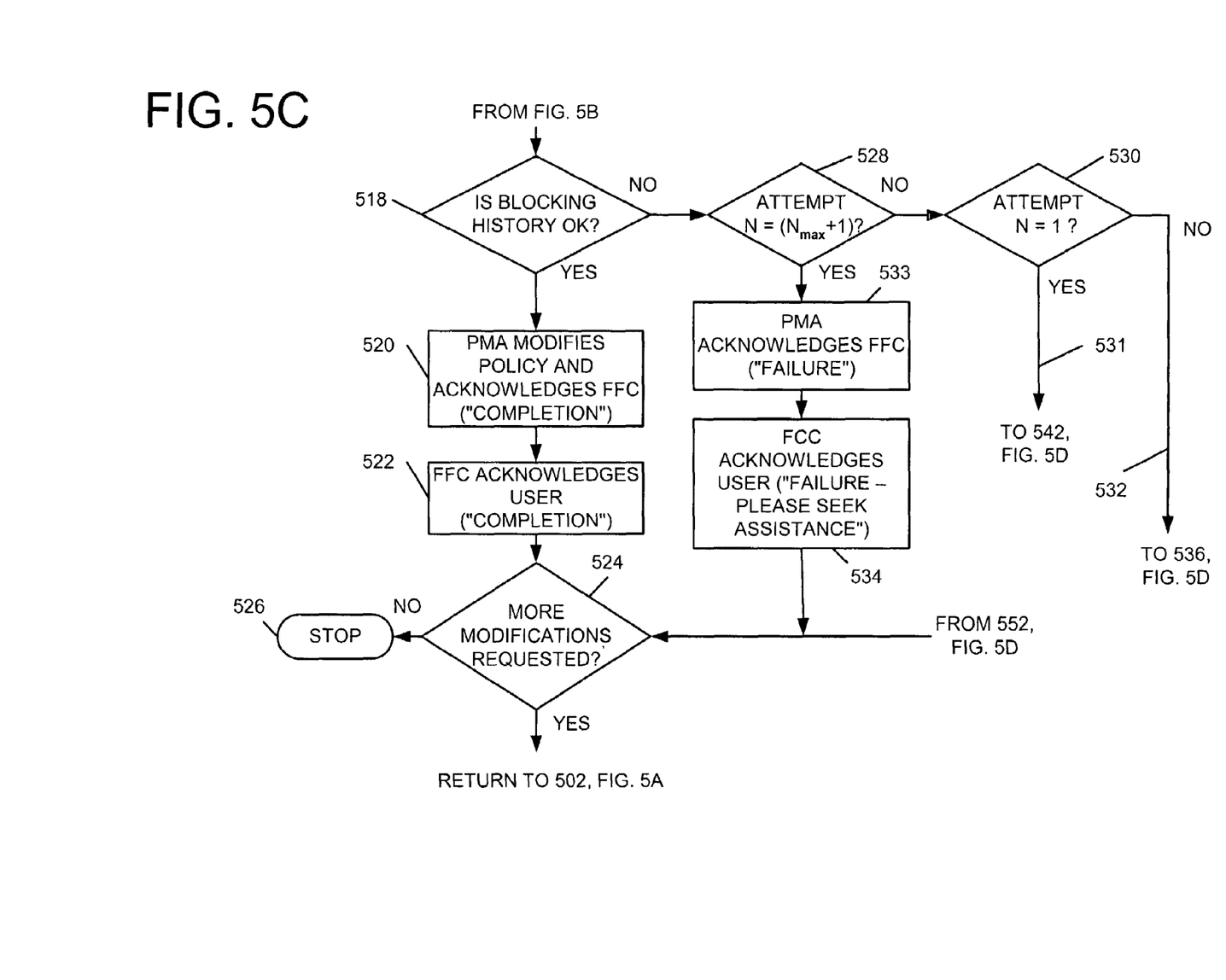

Referring to FIG. 5C, at 516, the PMA checks the blocking history. The PMA keeps and consults a database of packets, which have been previously blocked. New policy rules have been added that reflect the "new" application, and of these, which have then been allowed via being included in the user's firewall policy. At 518, the PMA checks the blocking history to determine if the blocking history is acceptable. In an example, by checking this database the PMA can determine if any of the identified packets (e.g., to/from the user's processing device during the time window) are either (a) packets associated with applications already included in the user's firewall policy, or (b) packets, not included in the user's firewall policy, that have been previously encountered and blocked. In either case, such packets are categorized as "questionable" and will initially be excluded from the new firewall policy rules added for the "new" application. Optionally, for greater security even during the time window, the firewall could block all questionable packets that are of the previously-blocked variety.

If the blocking history is completely acceptable i.e., the PMA finds no questionable packets, at 520, the user's firewall policy is modified by adding new rules allowing the passage of the new application's packet types to the set of firewall policy rules. Optionally in some cases, it may be possible to modify existing rules rather than adding new rules, depending on the specifics of the rules and their parameters. The firewall policy rules are preferably formed from the pertinent aspects of the identified packets, such as the source and destination addresses, source and destination ports numbers, whether TCP or UDP packets, or other protocol numbers, etc. Optionally, additional data can be utilized to help form the new firewall policy rules, as for example the type of application (e.g., Voice-over-IP, teleconferencing, or other application type which may indicate filtering information potentially pertinent to a firewall), which may be asked for and conveyed in the original user notification or request if appropriate. At 522, once the firewall policy is modified, the PMA acknowledges the completion of the process to the FFC, which preferably relays the acknowledgement to the user. In an embodiment, the new rule formation method or mechanism itself is simple (e.g., just rigorously matching the rule parameters to the identified aspects). In an alternate embodiment, the method or mechanism may be complex (e.g., potentially allowing some modification or variation or flexibility in parameters, based on a set of configurable if-then rules associated with various types of packets, protocols, and applications). If the user requests more modifications at 524, the process continues at FIG. 5A, step 502. If the user requests no more modifications, the process ends at 526.

If the blocking history is not acceptable, meaning that one or more types of packets are observed that are questionable as defined previously, then steps must be taken to modify the policy to allow only the packet types needed for the proper operation of the new application as it communicates through the firewall, while encountering some difficulty in identifying these packet types and separating them from other questionable packets that might have been encountered. This can be done, but one or more additional successive policy modification attempts utilizing separate time windows may be required to accomplish it. For clarity, the number of the attempt will be denoted here by the variable N, such that N=1 for the $1^{st}$ attempt, N=2 for the $2^{nd}$ attempt, N=3 for the $3^{rd}$ attempt, etc.

At 528, the PMA determines whether a predetermined configurable number of attempts, denoted by $N_{max}$, have been exceeded, for example four attempts if $N_{max}$ is configured as $N_{max}$=4. If no, at 530 the PMA determines if the current attempt is the initial (i.e., the $1^{st}$) attempt, when N=1. If yes, the process continues on FIG. 5D at step 542. The PMA on the $1^{st}$ attempt must modify the firewall policy without allowing any of the questionable packets since it is possible that these questionable packets have nothing to do with the new application and this possibility must be assumed initially. Subsequently if the new application does not function with the firewall the user can repeat the policy modification process via additional attempts so that questionable packets can be added into the policy. But on this $1^{st}$ attempt, the PMA, at 542, first defines every possible group of questionable packet types, taken singly and also in every combination of two or more. This provides a set of questionable packet groups that may be added in one at a time in subsequent policy modification attempts, should subsequent attempts be necessary. Then at 544, the PMA prioritizes these defined groups based on the likelihood that they will be required for the new application to function through the firewall, and also labels these groups as "Group 2," "Group 3," "Group 4," . . . , up to "Group $N_{max}$" in order of priority. Thus group number "2" will be the highest priority group, or that group deemed most likely to be necessary for the new application to function, while the highest numbered group will be the lowest priority group, or that group deemed least likely to be necessary for the new application to function. This prioritization may be accomplished using a set of rules or logic replicating or approximating the expertise of security experts in regard to such a prioritization. For example, certain types of packets or packets with certain characteristics are well know to be inherently dangerous or dangerous in some circumstances, while other packet types or characteristics are well known to be very uncommon, and yet other packet types or characteristics are well known to be seldom associated with applications or certain types of applications. Furthermore, other rules may be employed such as giving higher priority to packets with port numbers closer to the new application's non-questionable packets, or otherwise related in some manner to the application's already allowed packets. Additional rules and methods could be easily developed for prioritization, or developed with more difficulty and complexity, and any of these could be utilized by the PMA. In this $1^{st}$ attempt, the PMA, at 546, will then modify the firewall policy without allowing any of the questionable packet groups to be added. At 548, the PMA updates the blocking history by storing the questionable packet groups, the ordering of the groups, and the group labels in the blocking history database for use if subsequent attempts are needed or requested by the user/customer. For example, if the PMA finds one or more questionable packet types, the user's firewall policy is modified but the questionable packets are excluded by for example, filtering rules which would reflect these packets are not added to the user's rule-set.

At 550, the PMA acknowledges to the FFC that the modification process is complete (with questionable packets excluded). At 552, the FFC acknowledges the completion of the modification process to the user and preferably alerting the user that, although the policy modification was successful, circumstances are such that some ambiguity was encountered and the user may need to repeat the process if the "new" application does not function properly through the firewall process. If the user finds that the application does not function, then the user can repeat the policy modification process via step 524 on FIG. 5C, and the process continues on FIG. 5A at step 502 with another notification sent by the user/customer to the FFC to modify the user's firewall policy.

If at 524, the user/customer finds that the application functions well, for example because the questionable packets apparently were not associated with the application, and no more modifications are requested the process is complete and ends at 526.

Figure 5D:
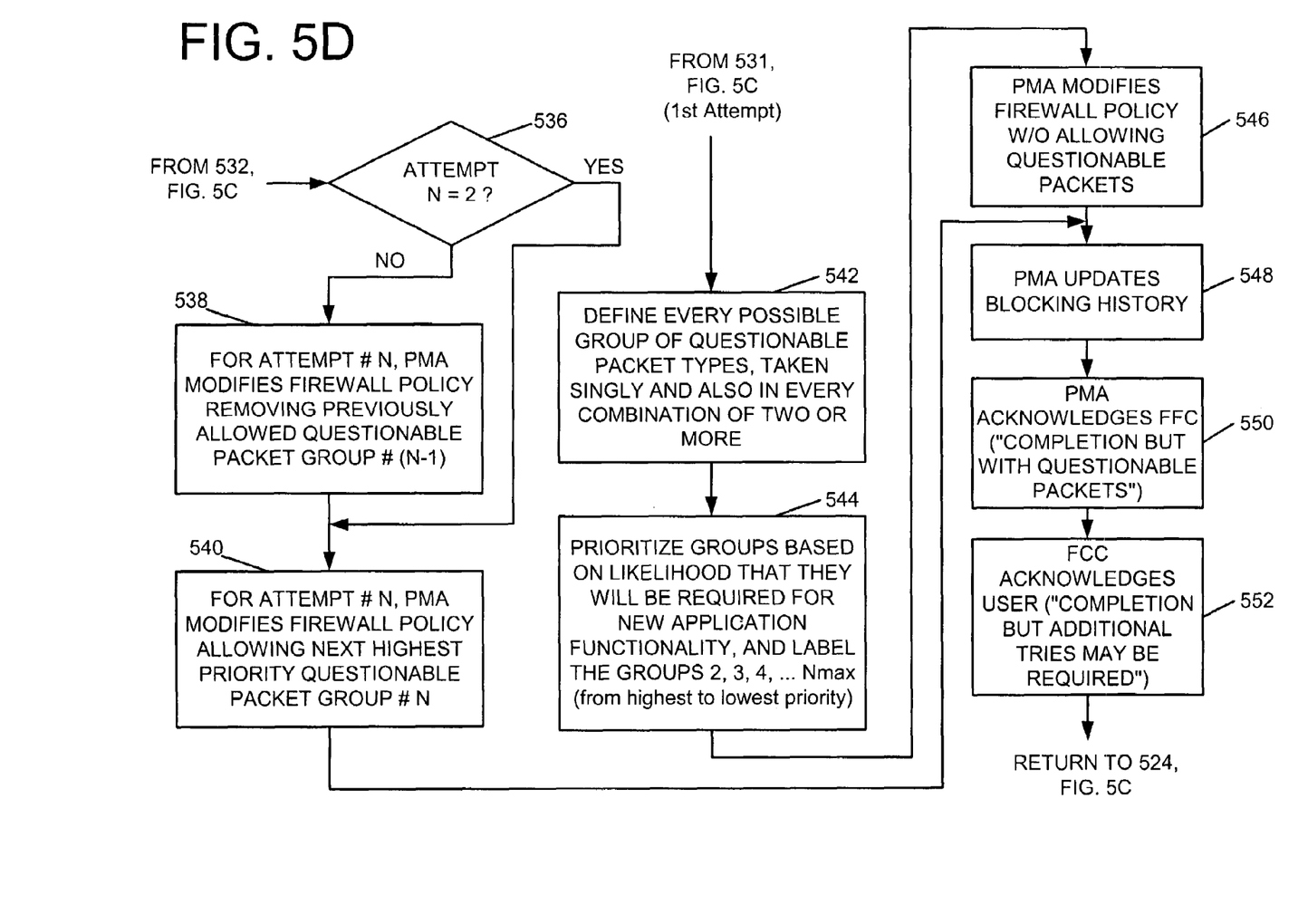

In an example, the application does not function well because one or more of the types of "questionable" packets are actually associated with the "new" application and are necessary for it to function, yet they are blocked by the firewall since new rules or modifications were not added in the $1^{st}$ policy modification attempt to the user/customer's policy to allow passage of these packets through the firewall. Therefore, on repeated policy modification attempts initiated by the user/customer, where the highest untried questionable packet group will be preferably identified by the PMA via searches of the blocking database, the PMA will try to include the proper set of packet types in the rule-set for the "new" application by adding in the "questionable" packet types, one at a time and subsequently, in combinations. For example, if two types of questionable packets were recorded, the PMA chooses one of these and adds it into the user's firewall policy rule-set on the second attempt. The FFC, and thence the user, is acknowledged accordingly. If the application still does not function, the PMA will choose the other questionable packet type and add it into the user's firewall policy on the next attempt. The PMA may be configured to remove the first questionable packet type on this attempt, or to leave it in (and just add the second type). Optionally, additional logic may be incorporated into the PMA to help it choose which types of "questionable" packets to add in to the firewall policy on repeated attempts. Similarly to the approach indicated above in steps 542 and 544, this could be done by configuring an ordered list of packet characteristics indicating which questionable packet types are safest to add, and which are least safe, based on generally accepted security assessments (e.g., TCP packets could be incorporated into the rule-set before UDP packets, low-numbered port packets could be added before high-numbered port packets, and known packet or protocol types could be added in before unknown types).

In an example where questionable packets were encountered and the user must repeat the policy modification process since the $1^{st}$ attempt (which did not add questionable packets to the firewall policy) was not successful at providing proper functionality for the new application, the pertinent portion of the process continues at 528 on FIG. 5C, where the PMA determines whether a predetermined configurable number of attempts, denoted by $N_{max}$, have been exceeded, for example four attempts if $N_{max}$ is configured as $N_{max}=4$. If no, at 530 the PMA determines if the current attempt is the initial (i.e., the $1^{st}$) attempt, when N=1. If no, the process will continue at step 536 on FIG. 5D where the PMA determined the current attempt is the $2^{nd}$ attempt, meaning whether or not the attempt number N=2. If yes, step 538 is skipped and the process continues at step 540. If no, then step 538 is not skipped, but instead the PMA at 538 removes the previously allowed questionable packet group, number (N−1). Note that this is not possible on the $2^{nd}$ attempt since no questionable packet group was allowed to be added to firewall policy in the $1^{st}$ attempt, and thus there is nothing to remove in step 538, hence step 538 is skipped on the $2^{nd}$ attempt as mentioned above.

On attempts after the first attempt, including attempts number N=2, 3, 4, etc., the PMA, at step 540, modifies the firewall policy of the user/customer by adding rules or modifications allowing the next highest priority questionable packet group, namely the group labeled N, the same number as the attempt number. At 548, the PMA updates the blocking history, as has been previously discussed in a number of aspects.

At 550, the PMA acknowledges to the FFC that the modification process is complete (with questionable packets excluded). At 552, the FFC acknowledges the completion of the modification process to the user and preferably alerting the user that, although the policy modification was successful, circumstances are such that some ambiguity was encountered and the user may need to repeat the process if the "new" application does not function properly through the firewall process. If the user finds that the application does not function, then the user can repeat the policy modification process via step 524 on FIG. 5C, and the process continues on FIG. 5A at step 502 with another notification sent by the user/customer to the FFC to modify the user's firewall policy.

Again for each subsequent policy modification attempt after the 1$^{st}$ attempt, if at 524, the user finds that the application functions well, for example because the questionable packets apparently were not associated with the application, and no more modifications are requested, the process is complete and ends at 526.

The number of re-tries is configurable. After a configurable number of repeat policy modification attempts is exceeded at step 528 on FIG. 5C, for example, four attempts in the case where $N_{max}$ is configured as $N_{max}=4$, at 533 a "failed" acknowledgement is sent by the PMA to the FFC. At 534, the failed attempt acknowledgement is sent by the FCC to the user, and this acknowledgement also tells the user to "seek assistance." In an example, the FFC optionally notifies system administrators and/or helpdesk staff to proactively assist the user. Preferably, the configured choice of how many re-tries would be allowed before the PMA "fails" the process is chosen based on the operations aspects of the system or service (e.g., how many helpdesk staff are available) and on some of the design particulars (e.g., whether additional/optional means are incorporated to aid the PMA in its choice of which questionable packets types are added first, in which combination, etc.). The safer (i.e., more secure) the choices made by the PMA regarding the details of policy modification and/or the order in which specific policy rules are added, the fewer re-tries are needed since the PMA is allowed to additively modify policy on subsequent attempts without having to simultaneously remove previously added rules reflecting questionable packets. The order of firewall policy rules is significant since a typical firewall checks the rules in order for a match with the packet currently being inspected or examined, such that certain orderings of rules may be "safer" than other ordering choices. That is, if a relatively safe ordering is used, then it is somewhat less critical to arrive at the exact set of rules for the application although this is preferable. Ultimately, the choice of how many repeats to allow the user hinges on how much effort or inconvenience is required from the user in extreme cases. Assuming that it is desirable to limit this inconvenience, a reasonably small number of repeats may be allowed.

In an alternative preferred embodiment, for maximum security and flexibility, the user via appropriate acknowledgements and interactions, notifications or requests to the FFC is given the choice of repeating the process until the exact set of rules is found, regardless of how many repeated attempts is required. Each attempt makes some incremental progress toward the goal, so this is feasible no matter how many questionable packet types are recorded during the time window. Increased effort is required by the user since a large number of repeats (e.g., maybe up to 6 or 7 repeats) may be needed until the PMA can arrive at the exact rule-set for a particularly problematic "new" application.

In another alternative preferred embodiment, in the case of a complex application which after a protracted period of time begins to try to use additional packet types in its communications (i.e., which were not accounted for by the PMA in the original policy configuration or modification), the PMA could be configured to continuously, periodically or randomly watch for patterns in the packet flow associated with each of the user's applications. When new types of packets are noticed by the firewall's packet inspector (and thus by the PMA), at the same time as recognized packet types associated with one or more of the user's firewall-configured applications, this information is conveyed to the user indicating that the user may now wish to or need to repeat the policy modification process. The user may eventually notice a problem with an application, since the new packet types are likely to be blocked by the firewall, resulting in some outward sign to the user. However, providing specific notification to the user immediately, spares the user from having to try to figure out what is wrong, especially since the user may incorrectly assume that the firewall policy is not to blame, e.g. that the policy was "taken care of" previously and so can now be ignored.

Preferred embodiments of this invention provide a user with knowledge that a firewall policy is no longer accurate for a given application allows the user to repeat the modification process for the affected application, thereby fixing problems and enabling firewall compatibility with minimal effort while maintaining maximum security. Otherwise the user may turn off a firewall completely, which results in a complete lack of security. By utilizing preferred embodiments of this invention, the user at their discretion can repeat the firewall policy modification process for a particular application at any time, in which case the PMA will be able to recognize by via consulting the blocking database that the attempt is for an application that has already been incorporated into the user's firewall policy, and will act accordingly when modifying the user's rule-set.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

The invention claimed is:

1. A system for providing network-based firewall policy configuration and facilitation associated with a firewall, the system comprising:

a memory device for storing a program for providing the network-based firewall policy configuration and facilitation associated with the firewall; and a processor, functionally coupled to the memory device, the processor being responsive to computer-executable instructions contained in the program and operative to:

receive a first request to add an application not currently supported by a user's firewall policy, generate a time window during which a user can run the application, receive a firewall modification request to modify the user's firewall policy to allow the application, determine whether the application includes one or more questionable packets, and if the application is determined to include one or more questionable packets, modify the user's firewall policy to allow packets associated with the application determined not to be questionable to pass through the firewall unblocked and exclude the one or more questionable packets associated with the application from modification of the user's firewall policy such that the one or more questionable packets are blocked from passing through the firewall.

2. The system of claim 1, wherein the processor is further operative to decode and decrypt the first firewall modification request, and to authenticate the user before taking action on the first request.

3. The system of claim 1, wherein the processor is further operative to:

receive a second request to add the application; and modify the user's firewall policy to allow at least a portion of the previously blocked one or more questionable packets associated with the application to pass through the firewall unblocked.

4. The system of claim 1, wherein the one or more questionable packets include packets or packet types that are already part of the user's firewall policy or packets previously blocked at times other than during the time window but which are now observed during the time window.

5. The system of claim 1, wherein the processor is further operative to record the one or more questionable packets in a blocking history database if the application is determined to include one or more questionable packets.

6. The system of claim 1, wherein the processor is further operative to send an acknowledgement to the user that modification of the user's firewall policy was successful, the acknowledgement including an alert regarding the one or more questionable packets if the application is determined to include the one or more questionable packets.

7. The system of claim 1, wherein the processor is further operative to:

attempt to modify the user's firewall policy a configurable number of times; and if unsuccessful, notify the user to seek assistance or to notify appropriate personnel for assistance.

8. The system of claim 1, wherein the processor is further operative to group the one or more questionable packets into one or more groups based on a type associated with the one or more questionable packets if the application is determined to include one or more questionable packets.

9. The system of claim 8, wherein the processor is further operative to:

prioritize the groups based on a likelihood that the groups will be required to be added to the user's firewall policy in order to allow the new application to function properly; and label the groups in order of priority.

10. The system of claim 9, wherein the processor is further operative to perform successive policy modification attempts to allow one or more of the questionable packet groups previously excluded from modification of the user's firewall policy having a next highest priority to pass through the firewall unblocked.

11. A method for modifying a firewall policy of a network-based firewall, the method comprising:

receiving a first request to modify the firewall policy to incorporate filtering rules to allow packets associated with a new application to pass through the network-based firewall without being blocked;

sending a user an indication of a time window during which the user can exercise the new application;

examining the packets traversing to/from the network-based firewall from/to the user to determine whether the new application includes one or more questionable packets; and if the new application is determined to include one or more questionable packets, then:

modifying the firewall policy to allow packets associated with the new application determined not to be questionable to pass through the network-based firewall unblocked, and excluding the one or more questionable packets associated with the new application from modification of the user's firewall policy such that the one or more questionable packets are blocked from passing through the network-based firewall.

12. The method of claim 11, further comprising acknowledging the first modification request and sending an acknowledgement of the first modification request to a user's processing device.

13. The method of claim 11, further comprising authenticating the user before acting on the first modification request.

14. The method of claim 11, further comprising notifying a policy modifier of the first request to modify the firewall policy, wherein notifying the policy modifier further comprises providing a name of the new application and a time frame for modifying the firewall policy.

15. The method of claim 11, further comprising sending an acknowledgement of completion of the modification to a user's processing device.

16. The method of claim 11, wherein the one or more questionable packets are associated with an application other than the new application.

17. The method of claim 11, wherein the one or more questionable packets include packets or packet types already included in the firewall policy or which were previously blocked at times other than during the time window but which are now observed during the time window.

18. The method of claim 11, further comprising:

receiving a second request to add the new application; and further modifying the user's firewall policy to allow at least a portion of the previously blocked one or more questionable packets associated with the new application to pass through the network-based firewall unblocked.

19. The method of claim 11, further comprising if the new application is determined to include one or more questionable packets, recording the one or more questionable packets in a blocking history database.

20. The method of claim 11, further comprising sending an acknowledgement to a user's processing device to repeat an attempt to modify the firewall policy when the new application does not function properly through the network-based firewall after the firewall policy has been modified.

21. The method of claim 11, further comprising notifying a user's processing device after a configurable number of repeat attempts fail to modify the firewall policy such that the new application can function properly through the firewall.

22. The method of claim 11, further comprising if the new application is determined to include one or more questionable packet, grouping the one or more questionable packets into one or more groups based on a type associated with the one or more questionable packets.

23. The method of claim 22, further comprising prioritizing the groups based on a likelihood that the groups will be required to be added to the firewall policy in order to allow the new application to function, properly; and labeling the groups in order of priority.

24. The method of claim 23, further comprising performing successive policy modification attempts to allow one or more of the questionable packet groups previously excluded from modification of the user's firewall policy having a next highest priority to pass through the network-based firewall unblocked.

25. A computer-readable storage medium for providing network-based firewall policy configuration and facilitation associated with a firewall, comprising:
   logic configured to receive a first request to modify a firewall policy to incorporate filtering rules to allow packets associated with a new application to pass through the firewall without being blocked;
   logic configured to send a user an indication of a time window during which the user can exercise the new application;
   logic configured to examine the packets traversing to/from the firewall from/to the user to determine whether the new application includes one or more questionable packets; and
   if the application is determined to include one or more questionable packets, logic configured to modify the firewall policy to allow packets associated with the new application determined not to be questionable to pass through the firewall unblocked and exclude the one or more questionable packets associated with the new application from modification of the firewall policy such that the one or more questionable packets are blocked from passing through the firewall.

26. The computer-readable storage medium of claim 25, further comprising logic configured to acknowledge the first modification request and logic configured to send an acknowledgement of the first modification request to a user's processing device.

27. The computer-readable storage medium of claim 25, further comprising logic configured to authenticate the user before acting on the first modification request.

28. The computer-readable storage medium of claim 25, further comprising logic configured to notify a policy modifier of the first request to modify the firewall policy, the logic configured to notify the policy modifier further configured to provide a name of the new application and a time frame for modifying the firewall policy.

29. The computer-readable storage medium of claim 25, further comprising logic configured to send an acknowledgement of completion of the modification to a user's processing device.

30. The computer-readable storage medium of claim 25, wherein the one or more questionable packets are associated with an application other than the new application.

31. The computer-readable storage medium of claim 25, wherein the one or more questionable packets include packets or packet types already included in the firewall policy or which were previously blocked at times other than during the time window but which are now observed during the time window.

32. The computer-readable storage medium of claim 25, further comprising:
   logic configured to receive a second request to add the new application; and
   logic configured to modify the firewall policy to allow at least a portion of the previously blocked one or more questionable packets associated with the new application to pass through the firewall unblocked.

33. The computer-readable storage medium of claim 25, further comprising logic configured to record the one or more questionable packets in a blocking history database if the new application is determined to include one or more questionable packets.

34. The computer-readable storage medium of claim 25, further comprising logic configured to send an acknowledgement to a user's processing device to repeat an attempt to modify the firewall policy when the new application does not function properly through the firewall after the firewall policy has been modified.

35. The computer-readable storage medium of claim 25, further comprising logic configured to notify a user's processing device after a configurable number of repeat attempts fail to modify the firewall policy such that the new application functions properly through the firewall.

36. The computer-readable storage medium of claim 25, further comprising logic configured to group the one or more questionable packets into one or more groups based on a type associated with the one or more questionable packets if the new application is determined to include one or more questionable packets.

37. The computer-readable storage medium of claim 36, further comprising logic configured to prioritize the groups based on a likelihood that the groups will be required to be added to the firewall policy in order to allow the new application to function properly, and to label the groups in order of priority.

38. The computer-readable storage medium of claim 37, further comprising logic configured to perform successive policy modification attempts to allow one or more of the questionable packet groups previously excluded from modification of the firewall policy having a next highest priority to pass through the firewall unblocked.

39. A system for providing network-based firewall policy configuration and facilitation associated with a firewall, comprising:
   a memory device for storing a program for providing the network-based firewall policy configuration and facilitation associated with the firewall; and
   a processor, functionally coupled to the memory device, the processor being responsive to computer-executable instructions contained in the program and operative to:
   receive a request to add an application not currently supported by a user's firewall policy,
   generate a time window during which a user can run the application,
   check packets observed during the time window to be associated with the application to determine whether the packets include one or more questionable packets,
   when the application is determined to include one or more questionable packets, group the one or more questionable packets by type, prioritize groups of the one or more questionable packets based on a likelihood that the groups will be required to be added to the firewall policy in order to allow the application to function properly, and modify the user's firewall policy to allow packets associated with the application determined not to be questionable to pass through the firewall unblocked and exclude the groups of the one or more questionable packets associated with the application from modification of the user's firewall policy such that the groups of the one or more questionable packets are blocked from passing through the firewall.

40. The system of claim 39, wherein the processor is further operative to perform successive policy modification attempts to allow one or more of the groups of the one or more questionable packets previously excluded from modification of the user's firewall policy to pass through the firewall unblocked, an order of the one or more groups allowed to pass through the firewall unblocked based on a priority associated with each of the one or more groups.

41. A method for modifying a firewall policy of a network-based firewall, comprising:

notifying a coordinating entity of a request to modify the firewall policy to incorporate filtering rules to allow packets from a new application to pass through the network-based firewall without being blocked;

notifying a policy modifier of the modification request;

sending a user an indication of a time window during which the user can exercise the new application;

examining the packets traversing to/from the network-based firewall from/to the user to determine whether the packets include one or more questionable packets;

when the application is determined to include one or more questionable packets, grouping the one or more questionable packets by type;

prioritizing groups of the one or more questionable packets based on a likelihood that the groups will be required to be added to the firewall policy in order to allow the new application to function properly;

modifying the firewall policy to allow packets associated with the application determined not to be questionable to pass through the firewall unblocked; and excluding the groups of the one or more questionable packets associated with the application from modification of the firewall policy such that the groups of the one or more questionable packets are blocked from passing through the firewall.

42. The method of claim 41, wherein examining the packets further comprises performing successive policy modification attempts to allow one or more of the groups of the one or more questionable packets previously excluded from modification of the firewall policy to pass through the network-based firewall unblocked, an order of the one or more groups allowed to pass through the firewall unblocked based on a priority associated with each of the one or more groups.

43. A computer-readable storage medium for providing network-based firewall policy configuration and facilitation associated with a firewall, comprising:

logic configured to notify a coordinating entity of a request to modify a firewall policy to incorporate filtering rules to allow packets from a new application to pass through the firewall without being blocked;

logic configured to notify a policy modifier of the modification request;

logic configured to send a user an indication of a time window during which the user can exercise the new application;

logic configured to examine the packets traversing to/from the firewall from/to the user to determine whether the packets include one or more questionable packets;

when the packets are determined to include one or more questionable packets, logic configured to group the one or more questionable packets by type;

logic configured to prioritize groups of the one or more questionable packets based on a likelihood that the groups will be required to be added to the firewall policy in order to allow the new application to function properly; and logic configured to modify the firewall policy to allow packets associated with the new application determined not to be questionable to pass through the firewall unblocked and to exclude the groups of the one or more questionable packets associated with the new application from modification of the user's firewall policy such that the groups of the one or more questionable packets are blocked from passing through the firewall.

44. The computer-readable storage medium of claim 43, further comprising logic configured to perform successive policy modification attempts to allow one or more of the groups of the one or more questionable packets previously excluded from modification of the firewall policy to pass through the firewall unblocked, an order of the one or more groups allowed to pass through the firewall unblocked based on a priority associated with each of the one or more groups.

* * * * *